(12) United States Patent
Melchin et al.

(10) Patent No.: US 10,480,122 B2
(45) Date of Patent: Nov. 19, 2019

(54) CARPET COATING COMPOSITIONS

(71) Applicant: WACKER CHEMIE AG, München (DE)

(72) Inventors: Timo Melchin, Mehring (DE); Holger Künstle, Burghausen (DE); Doris Pfingstl, Burgkirchen (DE); Robert Tangelder, Laren (NL)

(73) Assignee: Wacker Chemie AG, Munich (DE)

( * ) Notice: Subject to any disclaimer, the term of this patent is extended or adjusted under 35 U.S.C. 154(b) by 94 days.

(21) Appl. No.: 15/564,262

(22) PCT Filed: Apr. 8, 2016

(86) PCT No.: PCT/EP2016/057861
§ 371 (c)(1),
(2) Date: Oct. 4, 2017

(87) PCT Pub. No.: WO2016/166037
PCT Pub. Date: Oct. 20, 2016

(65) Prior Publication Data
US 2018/0135242 A1 May 17, 2018

(30) Foreign Application Priority Data

Apr. 17, 2015 (DE) .......................... 10 2015 206 954

(51) Int. Cl.
*D06N 7/00* (2006.01)
*C09D 131/04* (2006.01)
*C09D 123/08* (2006.01)

(52) U.S. Cl.
CPC ..... *D06N 7/0086* (2013.01); *C09D 123/0853* (2013.01); *C09D 131/04* (2013.01); *D06N 2201/0263* (2013.01); *D06N 2203/045* (2013.01)

(58) Field of Classification Search
CPC ............. D06N 7/00; D06N 2201/0263; D06N 2203/045; C09D 131/04; C09D 123/0853
See application file for complete search history.

(56) References Cited

U.S. PATENT DOCUMENTS

| | | | |
|---|---|---|---|
| 3,779,799 A | 12/1973 | Kennedy et al. | |
| 4,239,563 A | 12/1980 | Iacoviello | |
| 4,735,986 A | 4/1988 | Iacoviello | |
| 5,026,765 A | 6/1991 | Katz et al. | |
| 5,349,009 A * | 9/1994 | Furlan | C09J 131/04 524/563 |
| 6,359,076 B1 | 3/2002 | Lunsford et al. | |
| 9,624,622 B2 * | 4/2017 | Muller | D06N 7/0063 |
| 2010/0179272 A1 | 7/2010 | Balzarek et al. | |
| 2012/0009379 A1 | 1/2012 | Müller et al. | |

FOREIGN PATENT DOCUMENTS

| | | |
|---|---|---|
| CN | 101657513 A | 2/2010 |
| EP | 0851015 A1 | 7/1998 |
| GB | 1298155 | 11/1972 |
| WO | 9000967 A1 | 2/1990 |
| WO | 2006007157 A1 | 1/2006 |
| WO | 2010089142 A1 | 8/2010 |
| WO | 2011139267 A1 | 11/2011 |
| WO | 2011140065 A2 | 11/2011 |
| WO | 2012020319 A2 | 2/2012 |
| WO | 2012020321 A2 | 2/2012 |
| WO | 2012049413 A1 | 4/2012 |
| WO | 2013093547 A1 | 6/2013 |
| WO | 2013123210 A1 | 8/2013 |
| WO | 2014031579 A2 | 2/2014 |
| WO | 2015079317 A2 | 6/2015 |

OTHER PUBLICATIONS

International Search Report and Written Opinion for International Application PCT/US2016/057861, dated Jun. 29, 2016—8 Pages.
Fox, T. G., "Influence of Diluent and a Copolymer Composition on the Glass Temperature of a Polymer System", Bull Am. Physics Soc., 1, 3, pp. 123 (1956).
Brandrup et al., "Polymer Handbook", 2nd Edition, J. Wiley & Sons, New York (1975), 58 pages.
International Preliminary Report on Patentability for International Application No. PCT/EP2016/057861, dated Mar. 28, 2017, 8 pages.

* cited by examiner

Primary Examiner — Robert D Harlan
(74) Attorney, Agent, or Firm — RatnerPrestia

(57) ABSTRACT

The invention relates to the use of mixtures that contain an aqueous dispersion of a vinyl acetate polymer and an aqueous dispersion of a vinyl acetate-ethylene copolymer for carpet coating compositions, and corresponding carpet coating compositions, as well as carpets which are coated with such carpet coating compositions.

9 Claims, No Drawings

CARPET COATING COMPOSITIONS

CROSS-REFERENCE TO RELATED APPLICATIONS

This application is the U.S. National stage filing of International Application No. PCT/EP2016/057861, filed 8 Apr. 2016, and claims priority of German application number 10 2015 206 954.0, filed 17 Apr. 2015, the entireties of which applications are incorporated herein by reference.

FIELD OF THE INVENTION

The invention relates to the use of mixtures comprising an aqueous dispersion of a vinyl acetate polymer and an aqueous dispersion of a vinyl acetate-ethylene copolymer for carpet coating compositions, to corresponding carpet coating compositions and to carpets coated with such carpet coating compositions.

BACKGROUND OF THE INVENTION

Typical, commercially available carpets, for example continuous-sheeting product or carpet tiles, are manufactured by forming the carpet pile from tufts mechanically inserted, for example in the form of loops, into a woven or laid primary backing. In tufted carpet, the sheet like primary backing holds the loops but loosely, and the loops are therefore treated with a binder-containing formulation to stabilize the unfinished carpet. Said binder-containing formulation is precoated in a foamed or unfoamed state on the reverse side of the primary backing and in addition to an aqueous polymeric dispersion as binder typically further comprises fillers, for example chalk, and optionally further added substances, such as thickening agents, dispersing assistants or foaming assistants.

To improve their dimensional stability, the carpet products thus obtained may be provided a further, secondary backing. The secondary backing generally comprises a woven fabric in a manufactured fiber, such as polypropylene, polyamide or polyester, or in a natural fiber, such as jute. The secondary backing is attached to the as-precoated carpet by again applying a binder, the formulation of which may be similar to that of the coating material for the precoat. Again, in this second coating, the aforementioned aqueous polymeric dispersions, formulated as a foam or in an unfoamed state, may be applied together with fillers and further added substances, such as thickening agents, dispersing assistants or foaming assistants, to form a secondary coating.

WO 90/00967 A1 describes the use of aqueous dispersions of vinyl acetate-ethylene copolymers, styrene-butadiene copolymers or styrene-acrylate copolymers instead of PVC plastisol as binders in carpet manufacture. U.S. Pat. No. 3,779,799 describes the manufacture of a tufted carpet wherein the precoat used comprises binder compositions where the binder is a vinyl acetate-ethylene copolymer dispersion (VAE copolymer dispersion), a polyethylene dispersion or a dispersion of a carboxylated styrene-butadiene copolymer. U.S. Pat. No. 4,239,563 describes aqueous vinyl acetate-ethylene copolymer dispersions useful as binders for consolidation of carpets. The lower emission of volatile organic compounds (VOCs) as compared with styrene-butadiene lattices is emphasized. U.S. Pat. No. 4,735,986 describes a carpet binder comprising a composition comprising a vinyl acetate-ethylene copolymer dispersion comprising a stabilizer mixture of partially hydrolyzed PVOH, fully hydrolyzed PVOH and a nonionic, polyalkoxylated emulsifier. U.S. Pat. No. 5,026,775 described carpet coating compositions based on vinyl acetate-ethylene copolymer dispersions wherein the copolymers further contain monomer units whose homopolymers have Tg glass transition temperatures of at least 50° C. U.K. patent GB 1,298,155 describes carpet coating compositions based on aqueous crosslinkable binders comprising vinyl acetate-ethylene copolymers, polyvinyl alcohol (PVOH) and glyoxal. WO 2010/089142 A1 discloses a vinyl acetate-ethylene copolymer dispersion employed as a binder in carpet manufacture. The copolymer contains from 1 to 4 wt % of ethylene and is emulsifier stabilized only, although small amounts of protective colloid may be co-used for stabilization if necessary. A vinyl acetate homopolymer was tested as a comparative binder. The latter led to carpets of excessive stiffness and unsatisfactory breakage at 180°. To improve adherence to polyvinyl butyral sheeting (as secondary backing), WO 2006/007157 A1 proposes employing a vinyl acetate-ethylene copolymer further comprising from 10 to 10 wt % of comonomer units containing functional groups, such as carboxyl, amide, N-methylol or hydroxyalkyl groups. The copolymer is prepared using a mixture of emulsifier and from 0.05 to 4 wt % of protective colloid. U.S. Pat. No. 6,359,076 proposes improving the water resistance of carpet coatings by employing, in combination with a crosslinker, crosslinkable vinyl acetate-ethylene copolymers which include OH-functional monomer units. WO 2011/139267 A1 and WO 2011/140063 A2 teach carpet coatings based on vinyl acetate-ethylene copolymers comprising functional, crosslinkable comonomer units, such silane-functional or multifunctional comonomers, and not protective colloids but emulsifiers for stabilization purposes. WO 2012/020319 A2 or WO 2012/020321 A2 discloses carpets notable for low flammability or good washability. The binders used were vinyl acetate-ethylene copolymer dispersions having an average particle size dw of 50 to 500 nm, prepared by polymerization under emulsifier stabilization, although up to 3% of protective colloid may additionally be used as a costabilizer if necessary. WO 2013/003547 A2 relates to carpet binders having an optimized composition for formulations with carbon black as a filler. The binders used are vinyl acetate-ethylene copolymer dispersions stabilized with emulsifier and cellulose ether.

WO 2013/123210 A1 relates to carpets manufactured using binder mixtures formed from vinyl acetate-ethylene copolymer dispersions and styrene-butadiene copolymer dispersions. A proposal to improve the compatibility of the various polymeric dispersions involves eschewing polyvinyl alcohol in the VAE dispersion, and at most employing up to 1.5 wt % of polyvinyl alcohol, based on comonomers, as a protective colloid in the preparation thereof. WO 2014/031579 A2 relates to carpet coating compositions which by way of binders may include inter alia VAE dispersions which are emulsifier stabilized and may additionally contain if necessary up to 1.5 wt % of polyvinyl alcohol as a costabilizer. These dispersions are blended with an alpha-olefin-carboxylic acid copolymer and a crosslinker.

There is a need to further develop the properties of vinyl acetate-ethylene-based binders to formulate performance-balanced carpet coating compositions. An attempt in this regard is represented by the binder blends already referred to in WO 2013/123210 A1 which are based on vinyl acetate-ethylene copolymer dispersions and styrene-butadiene copolymer dispersions. Blends of this type are notable for high tuft withdrawal values in the binder mixtures used. However, the vinyl acetate-ethylene copolymer dispersion always contains an emulsifier, which has an adverse effect on filler compatibility and mechanical strength, especially the delamination resistances. Purely protective colloid-stabilized vinyl acetate-ethylene copolymer dispersions, for example with partially saponified polyvinyl alcohol or modified and/or unmodified celluloses, have by contrast good filler compatibilities and high mechanical, strengths, yet generally they are less compatible with styrene-butadiene copolymer dispersions and when included in mixtures absent specific emulsifiers and/or substantial dilution have a proclivity for coagulation or drastic increases in viscosity.

The use of vinyl acetate-ethylene copolymers as binders in secondary backings does provide control over the strength setting of the final carpet, through control of the glass transition temperature of the polymer, yet certain settings remain unattainable nonetheless. Particularly high strengths are but difficult to achieve and aligning the binder to the requirements of the end product while allowing a wide scope for varying the strength would lead to a commercially unattractive multiplicity of products. There is therefore a need for a product which allows the strengths in the ready-produced carpet to be established with mixed-stabilized (emulsifier as well as protective colloid) or purely protective colloid-stabilized vinyl acetate-ethylene copolymers while eschewing plasticizers or film-forming assistants and improves the mechanical strengths of the secondary backing binder comprising vinyl acetate-ethylene copolymer.

SUMMARY OF THE INVENTION

This profile of requirements was surprisingly achieved through the use of mixtures of vinyl acetate-ethylene copolymer dispersions and vinyl acetate homopolymer dispersions and surprising synergistically reinforcing effects in relation to tuft withdrawal force and delamination resistance over the dispersions not employed as a mixture were obtained. The coating compositions surprisingly and unexpectedly enable the establishment of specific strengths for the ready-produced carpet coupled with high delamination resistances and high tuft withdrawal forces.

The invention provide for the use of mixtures comprising an aqueous dispersion of a vinyl acetate polymer and an aqueous dispersion of a vinyl acetate-ethylene copolymer for carpet coating compositions.

DETAILED DESCRIPTION OF THE INVENTION

The vinyl acetate polymer is obtained via free-radically initiated emulsion polymerization of 99 to 100 wt % of vinyl acetate and optionally up to 1 wt % of further comonomers, all based on the total weight of the monomers, while the particulars in weight % for the comonomers add up to 100 wt % in each case, in an aqueous medium. The vinyl acetate polymer preferably contains no ethylene units. More preferably, no further comonomers are polymerized in addition to vinyl acetate.

The vinyl acetate-ethylene copolymer is obtained via free-radically initiated emulsion polymerization of 65 to 98 wt % of vinyl acetate and 2 to 30 wt % of ethylene, preferably 15 to 95 wt % of vinyl acetate and 5 to 25 wt % of ethylene, all based on the total weight of the monomers, in an aqueous medium. It is optionally possible to copolymerize further comonomers, up to 10 wt %, preferably 0.1 to 10 wt %, all based on the total weight of the monomers. It is particularly preferred not to copolymerize any further comonomers. The particulars in weight % for the comonomers add up to 100 wt % in each case.

Suitable further (co)monomers for the vinyl acetate polymer or the vinyl acetate-ethylene copolymer include in either case comonomers from the group of vinyl esters having 3 to 12 carbon atoms in the carboxylic acid moiety such as vinyl propionate, vinyl lactate, vinyl esters of alpha-branched carboxylic acids having 0 to 11 carbon atoms such as VeoVa®EH, VeoVa®9 or VeoVa®10 (tradenames of Resolution). Also suitable are methacrylic or acrylic esters of branched or unbranched alcohols having 1 to 15 carbon atoms such as methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate. Vinyl halides such as vinyl chloride are also suitable.

Suitable further (co)monomers also include ethylenically unsaturated mono- and dicarboxylic acids, preferably acrylic acid, methacrylic acid, fumaric acid and maleic acid; ethylenically unsaturated carboxamides and carbonitriles, preferably acrylamide and acrylonitrile; mono- and diesters of fumaric acid and maleic acid such as the diethyl and diisopropyl esters, and also maleic anhydride, ethylenically unsaturated sulfonic acids and/or salts thereof, preferably vinylsulfonic acid, 2-acrylamido-2-methyl-propanesulfonic acid. Further examples are precrosslinking comonomers such as polyethylenically unsaturated comonomers, examples being divinyl, adipate, diallyl maleate, allyl methacrylate or triallyl cyanurate, or postcrosslinking comonomers, examples being acrylamidoglycolic acid (AGA), methylacrylamidoglycolic methyl ester (MAGME), N-methylolacrylamide (NMA), N-methylolmethacrylamide (NMMA), N-methylolallyl carbamate, alkyl ethers such as the isobutoxy ether or esters of N-methylolacrylamide, of N-methylolmethacrylamide and of N-methylolallyl carbamate. Also suitable are monomers having hydroxyl or carboxyl groups, examples being hydroxyalkyl esters of methacrylic acid and of acrylic acid such as hydroxyethyl acrylate, hydroxyethyl methacrylate, hydroxypropyl acrylate, hydroxypropyl methacrylate, hydroxybutyl acrylate or hydroxybutyl methacrylate, and also 1,3-dicarbonyl compounds such as acetoacetoxyethyl acrylate, acetoacetoxypropyl methacrylate, acetoacetoxyethyl methacrylate, acetoacetoxybutyl methacrylate, 2,3di(acetoacetoxy)propyl methacrylate and allyl acetoacetate.

Suitable further (co)monomers include epoxide-functional comonomers such as glycidyl methacrylate, glycidyl acrylate, allyl glycidyl ether, vinyl glycidyl ether. Examples of suitable further (co)monomers also include silicon-functional comonomers, such as acryloyloxypropyltri(alkoxy)- and methacryloyloxypropyl-tri(alkoxy)silanes, vinyltrialkoxysilanes and vinyl-methyldialkoxysilanes, preferably with alkyl and/or alkoxy groups each having 1 or 2 carbon atoms, examples being vinyltrimethoxysilane, vinyltriethoxysilane, 3-methoacryloyloxy-propyltrimethoxysilane.

The monomer selection is in effect so made that the vinyl acetate polymer generally has a glass transition temperature Tg of +25° C. to +40° C. and the vinyl acetate-ethylene copolymer generally has a glass transition temperature Tg of −20° C. to +20° C. The glass transition temperature Tg of the polymers is quantifiable in a known manner using differential scanning calorimetry (DSC, DIN EN ISO 11357-1/2). The Tg is also approximately predictable using the Fox equation (Fox T. G., Bull. Am. Physics Soc. 1, 3, page 123 (1956)):$1/Tg = x1/Tg1 + x2/Tg2 + \ldots + xn/Tgn$, where xn is the mass fraction (wt %/100) of monomer n and Tgn is the glass transition temperature, in kelvins, of the homopolymer of monomer n. Tg values of homopolymers are reported in the Polymer Handbook 2nd Edition, J. Wiley & Sons, New York (1975).

The vinyl acetate polymer and the vinyl acetate-ethylene copolymer are both obtainable in a known manner, preferably via free-radically initiated emulsion polymerisation in water. Yet the polymerization processes used to prepare both the aqueous dispersion of the vinyl acetate polymer and the aqueous dispersion of the vinyl acetate-ethylene polymer are distinct.

The polymerization temperature in both cases is in the range from 40° C. to 120° C. and preferably in the range from 60° C. to 90° C. The copolymerization of gaseous comonomers, such as ethylene, is preferably carried out under superatmospheric pressure, generally between 5 bar and 120 bar. The initiation of the polymerization may be effected using the customary initiators for an emulsion polymerization, such as hydroperoxide or t-butyl hydroperoxide, or redox initiator combinations, with reducing agents, such as (iso)ascorbic acid or sodium hydroxymethanesulfinate (Brüggolit FF). The molecular weight is controllable by employing chain transfer agents during the polymerization.

The polymerisation of the vinyl acetate polymer is effected in the presence of protective colloid, optionally in combination with emulsifier. The polymerization of the vinyl acetate-ethylene copolymer is effected in the presence of protective colloid or in the presence of emulsifier or in presence of a combination of emulsifier and protective colloid.

Customary protective colloids for stabilizing the polymerization batch include, for example, partially or fully hydrolyzed polyvinyl alcohols; polyvinylpyrrolidones; polyvinyl acetals; polysaccharides in water-soluble form such as starches, celluloses or their derivatives, such as carboxymethyl, methyl, hydroxyethyl or hydroxypropyl derivatives; proteins such as casein or caseinate, soy protein, gelatin; lignosulfonates; synthetic polymers such as poly(meth)acrylic acid, copolymers of (meth)acrylates with carboxyl-functional comonomer units, poly(meth)acrylamide, polyvinylsulfonic acids and their water-soluble copolymers; melamine-formaldehyde sulfonates, naphthalene-formaldehyde sulfonates, styrene-maleic acid and vinyl ether-maleic acid copolymers.

Preference is given to celluloses or derivatives thereof, or partially hydrolyzed polyvinyl alcohols having an 80 to 95 mol % degree of hydrolysis and a Hoeppler viscosity in 4% aqueous solution of 1 to 40 mPas, especially 3 to 30 mPas (Hoeppler method at 20° C., DIN 53015). Particular preference is given to low molecular weight partially hydrolyzed polyvinyl alcohols each having a preferably 80 to 95 mol %, more preferably 85 to 90 mol % and most preferably 87 to 89 mol % degree of hydrolysis and a Hoeppler viscosity of in each case preferably 1 to 5 mPas and more preferably 2 to 4 mPas (as determined to DIN 53015, Hoeppler method, at 20° C., in 4% aqueous solution).

It is optionally also possible to use partially hydrolyzed high molecular weight, polyvinyl alcohols having a hydrolysis degree of preferably 80 to 95 mol % and Hoeppler viscosity, in 4% aqueous solution, of preferably >5 to 40 mPas, more preferably 8 to 40 mPas (DIN 53015 Hoeppler method at 20° C.) in admixture with the partially hydrolyzed low molecular weight polyvinyl alcohols. It is optionally also possible to use fully hydrolyzed high molecular weight polyvinyl alcohols having a hydrolysis degree of preferably 96 to 100 mol %, especially 98 to 100 mol %, and a Hoeppler viscosity, in 4% aqueous solution, of preferably 10 to 56 mPas (DIN 53015 Hoeppler method at 20° C.) in admixture with the partially hydrolyzed low molecular weight polyvinyl alcohols. The partially hydrolyzed high molecular weight polyvinyl alcohols and/or the fully hydrolyzed high molecular weight polyvinyl alcohols are each employed here in an amount of 0.1 to 4 wt %, all based on the total weight of the comonomers.

Preference is also given to modified polyvinyl alcohols, hereinafter also referred to as X-PVOH, having a hydrolysis, degree of 80 to 99.9 mol %, preferably of 85 to 95 mol %, and a Hoeppler viscosity, in 4% aqueous solution, of 1 to 30 mPas (as determined to DIN 53015 at 20° C.). Examples thereof are polyvinyl alcohols bearing functional groups, such as acetoacetyl groups. Preference is also given to the so-called E-PVOH polyvinyl alcohols, which contain ethylene units and are known, for example, by the trade name of EXCEVAL®, E-PVOHs are partially or preferably fully hydrolyzed copolymers of vinyl acetate and ethylene. Preferred E-PVOHs have an ethylene content of 0.1 to 12 mol %, preferably 1 to 7 mol %, more preferably 2 to 6 mol % and especially 2 to 4 mol %. The mass-average degree of polymerization is in the range from 500 to 5000, preferably in the range from 2000 to 4500 and more preferably in the range from 3000 to 4000. The hydrolysis degree is generally greater than 92 mol %, preferably in the range from 94.5 to 99.9 mol % and more preferably in the range from 98.1 to 99.5 mol %.

Said protective colloids are commercially available and are obtainable using methods known to a person skilled in the art. It is also possible to use mixtures of said protective colloids. The polymerization is preferably carried out in the presence of altogether 2 to 10 wt % of protective colloid, more preferably altogether 5 to 10 wt %, all based on the total weight of the monomers.

It is preferably nonionic emulsifiers which are used to stabilize the dispersion. Ionic, preferably anionic, emulsifiers are also usable. Combinations of nonionic emulsifiers with anionic emulsifiers are also usable. The emulsifier quantity is generally in the range from 0.1 to 5.0 wt %, based on the total weight of the comonomers.

Suitable nonionic emulsifiers include, for example, acyl, alkyl, oleyl and alkylaryl ethoxylates. These products are commercially available as Genapol® or Lutensol® for example. They subsume ethoxylated mono-, di- and trialkylphenols, preferably with an ethoxylation degree of 3 to 50 ethylene oxide units and $C_4$ to $C_{12}$ alkyl moieties; and also ethoxylated fatty alcohols, preferably with an ethoxylation degree of 3 to 80 ethylene oxide units and $C_8$ to $C_{36}$ alkyl moieties. Suitable nonionic emulsifiers further include $C_{13}$-$C_{15}$ oxo process alcohol ethoxylates having an ethoxylation degree of 3 to 30 ethylene oxide units, $C_{14}$-$C_{16}$ fatty alcohol ethoxylates with an ethoxylation degree of 11 to 80 ethylene oxide units, $C_{10}$ oxo process alcohol ethoxylates with an ethoxylation degree of 3 to 11 ethylene oxide units, $C_{13}$ oxo process alcohol ethoxylates with an ethoxylation degree of 3 to 20 ethylene oxide units, polyoxyethylene sorbitan monoleate with 20 ethylene oxide groups, copolymers of ethylene oxide and propylene oxide with a minimum ethylene oxide content of 10 wt %, polyethylene oxide ethers of oleyl alcohol with an ethoxylation degree of 4 to 20 ethylene oxide units, and also the polyethylene oxide ethers of nonylphenol with an ethoxylation degree of 4 to 20 ethylene oxide units.

Particular preferences is given to $C_{12}$-$C_{14}$ fatty alcohol ethoxylates with an ethoxylation degree of 3 to 30 ethylene oxide units.

Examples of suitable anionic emulsifiers include the sodium, potassium and ammonium salts of linear aliphatic carboxylic acids having 12 to 20 carbon atoms; sodium hydroxyoctadecanesulfonate; the sodium, potassium and ammonium salts of hydroxyl fatty acids having 12 to 20 carbon atoms and their sulfonation and/or acetylation products; the sodium, potassium and ammonium salts of alkyl sulfates, including as triethanolamine salts, and the sodium, potassium and ammonium salts of alkylsulfonates having 10 to 20 carbon atoms each and of alkylarylsulfonates having 12 to 20 carbon atoms; dimethyldialkylammonium chloride having 8 to 18 carbon atoms in the alkyl moiety and sulfonation products thereof: the sodium, potassium and ammonium salts of sulfosuccinic esters with aliphatic saturated monohydric alcohols having 4 to 16 carbon atoms and of sulfosuccinic 4-ester with polyethylene glycol ethers of monohydric aliphatic alcohols having 10 to 12 carbon atoms, especially their disodium salts; the sodium, potassium and ammonium salts of sulfosuccinic 4-ester with polyethylene glycol nonylphenyl ether, especially its disodium salt; the sodium, potassium and ammonium salts of biscyclohexyl sulfosuccinate, especially its sodium salt; lignosulfonic acid and also its calcium, magnesium, sodium and ammonium slats; resin acids and also hydrogenated and dehydrogenated resin acids and also their alkali metal salts.

To prepare the aqueous dispersion of the vinyl acetate polymer, no emulsifiers are preferably used during the polymerization nor admixed subsequently.

The polymerisation, is generally in each case carried out to a conversion of ≥95 wt %, preferably up to a conversion of from 95 to 99 wt %, for the monomers which are liquid under polymerization conditions.

The thereby obtainable aqueous dispersions of the vinyl acetate polymer or of the vinyl acetate-ethylene copolymer each have a solids content of 30 to 75 wt %, preferably of 50 to 65 wt %. Suitable aqueous dispersions of vinyl acetate polymers or of vinyl acetate-ethylene copolymers are also commercially available; Vinnapas® dispersions from Wacker Chemie AG for example.

The mixtures comprise at least one aqueous dispersion of a vinyl acetate polymer and at least one aqueous dispersion of a vinyl acetate-ethylene copolymer at a weight fraction of preferably 10 to 60 wt %, more preferably 10 to 40 wt % and most preferably 20 to 30 wt % of vinyl acetate polymer, all based on the total weight of vinyl acetate polymer and vinyl acetate-ethylene copolymer (dry/dry). The weight fraction of the vinyl acetate polymer may vary according to the glass transition temperature Tg of the vinyl acetate-ethylene copolymer. The lower the Tg thereof, the higher the possible choice for the fraction of vinyl acetate polymer.

The invention further provides carpet coating compositions prepared from
a mixture comprising an aqueous dispersion of a vinyl acetate polymer and an aqueous dispersion of a vinyl acetate-ethylene copolymer, 100 to 1400 wt % of fillers, based on the weight of the mixture of vinyl acetate polymer and vinyl acetate-ethylene copolymer (dry/dry), water,
and optionally one or more additives and optionally one or more added substances.

The solid content of the carpet coating compositions is preferably in the range from 72 to 83 wt % and more preferably in the range from 75 to 80 wt %, all based on the total weight of the carpet coating compositions. The carpet coating compositions have a Brookfield viscosity of preferably ≤7000 mPas, more preferably ≤3000 mPas (as measured with Brookfield RV measuring instrument with spindle 4, 20 rpm at 25° C.) following admixture of fillers and in the absence of additives or added substances.

Suitable fillers include, for example, kaolin, talcum, fluorite, fly ash, aluminum trihydrate, preferably chalk.

Examples of additives are thickening agents, such as polyacrylates or cellulose ethers, or foaming auxiliaries. Foaming auxiliaries are preferably admixed for foam application. Thickening agents may be admixed to establish the target viscosity of the carpet coating compositions. The amount of thickening agents needed for this is generally in the range from 0.1 to 6 wt % and preferably in the range from 1 to 3 all based on the weight of the mixture of vinyl acetate polymer and vinyl acetate-ethylene copolymer (dry/dry). It is preferably this method which is used to establish Brookfield viscosity of 2000 to 10000 mPas (measured with Brookfield RV measuring instrument using spindle 4, 20 rpm, at 25° C.). However, the procedure of the invention also makes it possible to eschew thickening agents.

Customary added substances include, for example, dispersants, wetting agents, pigments, hydrophobicizing agents or biocides, such as formaldehyde depot compounds, isothiazolinones, phenols or quaternary ammonium compounds. The carpet coating compositions are preferably free from plasticizers or film-forming assistants.

The carpet coating compositions contain from 100 to 1400 parts by weight of filler to 100 parts by weight of the mixture of vinyl acetate polymer and vinyl acetate-ethylene copolymer (dry/dry). This is also referred to as a fill level of 100% to 1400%. The amount of filler in the formulations may vary according to the coating properties desired. The higher the filler fraction (fill level), the lower the mechanical properties are.

The carpet coating compositions of the present invention are notable for a high level of filler compatibility. Namely, carpet coating compositions are now obtainable which consist of polymer dispersion, fillers and water, for example, and combine fill levels of 400 wt % to 1400 wt % of filler, based on the mixture of vinyl acetate polymer and vinyl acetate-ethylene copolymer (dry/dry), and a solids content of 75 to 85 wt % with a Brookfield viscosity of <700 mPas and more preferably of <3000 mPas (measured with Brookfield RV measuring instrument using spindle 4, 20 rpm, at 25° C.).

When the viscosity of a carpet coating composition before admixing the thickening agent is higher, the incorporation times for the filler are unacceptable long on an industrial scale, and there is a risk of forming undispersed clumps of filler that are able to destroy the carpet fabric.

The precoat preferably utilizes carpet coating compositions having fill levels of 300 to 1400%. Fill levels are particularly preferably in the range from 600 to 1000% for precoats for residential applications and from 300 to 600% for commercial applications such as offices, hotels or ships.

The secondary coating preferably utilizes carpet coating compositions with fill levels of 275 to 600% for residential applications and 200 to 275% for commercial applications such as offices, hotels or ships.

In a possible procedure for producing the carpet coating compositions, the aqueous dispersion of the vinyl acetate polymer and the aqueous dispersion of the vinyl acetate-ethylene copolymer are mixed and then the fillers are stirred in. Any additives and added substances may generally be admixed at any stage, preferably before admixture of fillers. The established carpet coating composition production equipment with which a person skilled in the art is familiar is suitable for producing the carpet coating compositions.

The invention further provides carpets coated with one or more carpet coating compositions of the invention in the precoat and/or secondary backing.

The carpet coating compositions are advantageously employable using existing processes in existing installations for carpet manufacture.

The carpet coating compositions are suitable for consolidation of carpets, for example continuous-sheeting products or carpet tiles. The carpet coating compositions are useful in the manufacture of tufted carpets, woven carpets or needlefelt carpets.

The examples which follow serve to further elucidate the invention:

Methods:

Determination of Grass Transition Temperature Tg:

The glass transition temperature Tg of polymers was determined via DSC (differential scanning calorimetry, DIN EN ISO 11357-1/2) using a DSC 1 differential scanning calorimeter from Mettler-Toledo in an open crucible at a heating rate of 10 K/min. The glass transition temperature was taken to be the temperature at the midpoint of the second heating curve (midpoint=half the step height).

Determination of Brookfield Viscosity:

The Brookfield viscosities of the aqueous polymeric dispersions were determined using a Brookfield RV viscometer, after conditioning to the reported temperature, by using the particular spindle reported, at the reported number of revolutions per minute. The viscosity is reported in mPas.

Determination of Particle Size Dw:

The average particle diameter Dw is determine using a Beckmann Coulter® LS to ISO 13320.

EXAMPLES

Dispersion A (A)

A nitrogen-purged 572 liter pressure reactor was initially charged with the following components:

125.2 kg of deionized water, 56.0 kg of a 20 wt % aqueous solution of a polyvinyl alcohol having an average hydrolysis degree of 88 mol % and a Hoeppler viscosity of 4 mPas (as determined to DIN 53015, at 20° C., in 4% aqueous solution), 26.1 kg of a 25 wt % aqueous solution of a fatty alcohol ethoxylate having an average ethoxylation degree of 30 mol EO units, 0.48 kg of a 1.0 wt % aqueous ammonium iron sulfate solution.

The initial charge was adjusted to pH 4.0 using 250 mL of formic acid (98 wt %).

Under agitation (stirring at 240 rpm), the initial charge was heated to 35° C. and injected with ethylene up to a pressure of 30 bar. On reaching the temperature of 35° C. and a pressure of 30 bar, the initiator feeds—consisting of an aqueous 3.5 wt % hydrogen peroxide solution and an aqueous 10 wt % sodium isoascorbate solution—were each started at 700 g/h. Once the reaction had started (10 minutes after the start of the initiator feeding), as was clearly apparent from the increase in the reactor internal temperature, the evolving heat of reaction lifted the reactor internal temperature to 85° C. concurrently, at 10 minutes after the reaction had begun, a vinyl acetate feed was started at 35.1 kg/h (feed time 120 min, 70.2 kg). On reaching a reactor internal temperature of 80° C., ethylene was reinjected up to a target pressure of 58 bar until a total ethylene quantity of 52.8 kg had been added.

On completion of the vinyl acetate feeds, the initiator feeds were each continued at 2000 g/h for a further 30 minutes, during which the pressure decreased to 20 bar. The batch was subsequently cooled down to 70° C. and transferred into a "pressureless" (low pressure) reactor and postpolymerized therein at a pressure of 700 mbar abs. by admixture of 2.6 kg of tert-butyl hydroperoxide solution (10 wt % in water) and 2.6 kg of sodium isoascorbate solution (10 wt % in water).

Solids content: 63 wt %

Brookfield viscosity: 1300 mPas (spindle 2, 20 rpm, 23° C.)

Particle size: Dw 1.0 μm, (Coultier LS)

Glass transition temperature: 7.0° C. (DSC)

Protective colloid: 3.1 wt %, based on comonomers

Emulsifier: 1.8 wt %, based on comonomers

Dispersion B (B)

An aqueous dispersion of a vinyl acetate homopolymer having a glass transition temperature of 33° C. and a 55 wt % solids content for the dispersion, stabilized with 6 wt % of a polyvinyl alcohol having an average hydrolysis degree of 88 mol % and a Hoeppler viscosity of 5 mPas (as determined to DIN 53015, at 20° C., in 4% aqueous solution), and 2.0 wt % of a polyvinyl alcohol having an average hydrolysis degree of 88 mol % and a Hoeppler viscosity of 50 mPas (as determined to DIN 53015, at 20° C., in 4% aqueous solution), while the particulars in wt % are all based on the vinyl acetate homopolymer.

Dispersion D (D)

Like dispersion B (vinyl acetate homopolymer dispersion, Tg=33° C., SC=55%) but with 7.0 wt % of a polyvinyl alcohol having an average hydrolysis degree of 88 mol % and a Hoeppler viscosity of 4 mPas (as determined to DIN 53015, at 20° C., in 4% aqueous solution), while the particulars in wt % are all based on the vinyl acetate homopolymer.

Dispersion E (E)

A nitrogen-purged 590 L pressure reactor was initially charged with the following components:

134.9 kg of deionized water, 75.9 kg of a 20 wt % aqueous solution of a polyvinyl alcohol having an average hydrolysis degree of 88 mol % and a Hoeppler viscosity of 4 mPas (as determined to DIN 53015, at 20° C., in 4% aqueous solution), 12.5 kg of a 10 wt % aqueous solution of a polyvinyl alcohol having an average hydrolysis degree of 88 mol % and a Hoeppler viscosity of 23-26 mPas (as determined to DIN 53015, at 20° C., in 4% aqueous solution), 224 kg of vinyl acetate, 0.48 kg of a 1.0 wt % aqueous ammonium iron sulfate solution.

The initial charge was adjusted with 250 mL of formic acid (98 wt %) to pH 4.0.

Under agitation (stirring at 240 rpm), the initial charge was heated up to 55° C. and ethylene was injected up to a pressure of 20 bar. On reaching the temperature of 55° C., and a pressure of 20 bar, the initiator feeds—consisting of an aqueous 3 wt % tert-butyl hydroperoxide solution and an aqueous 5 wt % ascorbic acid solution—were each started at 700 g/h. Once the reaction had started, as was clearly indicated by the increase in the reactor internal temperature, the evolving heat of reaction raised the reactor internal temperature to 90° C. and the pressure to 48 bar. The initiator feeds were both reduced to 350 g/h to police the reaction heat.

45 minutes after the reaction had begun, a vinyl acetate feed and a polyvinyl alcohol feed were started. Vinyl acetate was fed into the reactor over 90 minutes at a rate of 40 kg/h (=60 kg of vinyl acetate), while the polyvinyl alcohol—consisting of a 10 wt % aqueous solution of a polyvinyl alcohol having an average hydrolysis degree of 88 mol % and a Hoeppler viscosity of 4 mPas (as determined to DIN 53015, at 20° C., in 4% aqueous solution)—was added over 120 minutes at a rate of 14 kg/h (=28.0 kg of aqueous polyvinyl alcohol solution). Ethylene was reinjected during the polymerization at a target pressure of 44 bar until a total ethylene quantity of 34 kg had been injected.

On completion of the monomer feeds, the initiator feeds were each continued for a further 30 minutes at 1300 g/h, during which the pressure decreased to 20 bar. The batch was subsequently cooled down to 65° C. and transferred into a "pressureless" (low pressure) reactor and postpolymerized therein at a pressure of 700 mbar abs. by admixture of 1 kg of tert-butyl hydroperoxide solution (10 wt % in water) and 2 kg of ascorbic acid solution (5 wt % in water).

Solids content: 58 wt %
Brookfield viscosity: 1800 mPas (spindle 2, 20 rpm, 23° C.)
particle size: Dw 1.0 µm, (Coulter LS)
Glass transition temperature: 15.0° C. (DSC)
Protective colloid: 6.2 wt %, based on comonomers Dispersion C (C)

Like dispersion E except for the following monomer ratio: 77 wt % of vinyl acetate and 23 wt % of ethylene,
Solids content: 54 wt %
Brookfield viscosity: 280 mPas (spindle 1, 20 rpm, 23° C.)
particle size: Dw 1.0 µm, (Coulter LS)
Glass transition temperature: −6.0° C. (DSC)
Protective colloid: 6.3 wt %, based on comonomers Comparative Dispersion 1 (V1)

Styrene-butadiene latex DL 535 (DOW Chemical Company)
Solids content: 49.5-50.5%
Brookfield viscosity: max. 300 mPas (spindle 2, 50 rpm, 23° C.)
Glass transition temperature: 15° C.
Styrene content of polymer: 60.5%

Comparative Dispersion 2 (V2)

Styrene-butadiene latex DL 521M (DOW Chemical Company)
Solids content: 51.5-52.5%
Brookfield viscosity: 100-300 mPas (spindle 2, 50 rpm, 23° C.)
Glass transition temperature: 6.0° C.
Styrene content of polymer: 63%

Comparative Dispersion 3 (V3)

Styrene-butadiene latex XZ 92227.01 (DOW Chemical Company)
Solids content: 50.5-51.5%
Brookfield viscosity: 50-350 mPas (spindle 2, 50 rpm, 23° C.)
Glass transition temperature: −15.0° C.

Preparation of Carpet Coating Compositions:

Dispersions A to E and Comparative Dispersion V1 to V3 and mixtures thereof were used to prepare carpet coating compositions on the basis of the following formulation:

| | |
|---|---|
| 100 parts by weight | of the particular dispersion or mixture (polymer dry), |
| 450 parts by weight | of chalk (Carbocia 80, Carbocia) (filler), |
| 0.5 part by weight | of foaming assistant (sodium laurylsulfate). |

The particulars in parts by weight are based on the dry weight of the particular carpet coating composition.

Additional water was added in an amount so as to obtain carpet coating compositions having a solids content of 81.5 wt %. With the mixtures of styrene-butadiene copolymers and vinyl acetate homopolymers, water was admixed until the target viscosity of 6000 to 7000 mPas was attained (as measured with Brookfield RV measuring instrument with spindle 4, 20 rpm, at 25° C.).

The carpet coating compositions were prepared by initially charging the water and the particular dispersion or dispersion mixture and under agitation admixing the filler and thereafter the foaming assistant.

The carpet coating compositions had a solids content of 81.5 wt % and a fill level of 450 wt %.

A final viscosity of 6500 mPas (measured with Brookfield RV measuring instrument using spindle 4, 20 rpm, at 25° C.) was then established by admixing a thickening agent (Matco TR 10 acrylate thickening agent, from Matco).

Final viscosities of 6000 to 7000 mPas are acceptable, in general.

Production of Carpets:

The particular carpet coating composition described above was frothed up for 3 minutes using a kitchen appliance to foam densities of 950 to 1015 g/l.

A Helsinki style greige loop pike tufted carpet from Edel (100% poly-amide; 550 g/m² pile weight) 38 cm×33 cm in size was uniformly pre-coated with 148 g of the particular frothed carpet coating composition.

This was followed by the application, and uniform spreading, of 60 g of the particular frothed carpet coating composition as a secondary coating. A textile backing (Action Back polypropylene weave) was then placed on top and worked in twice with a 1.6 kg roller without pressure. Drying was done in an oven at 130° C. for 20 minutes.

Measurement of Tuft Withdrawal Force:

Testing of the tuft withdrawal force was done in accordance with ISO 4919 using a Zwick tester at 23° C. and 50% relative humidity. The particular carpet was clamped in the top part on the base of the measuring device and a needle was threaded into a carpet loop. The force needed to pull a loop out of the carpet was determined on ten different carpet loops. The mean of the measured results was reported as the dry tuft withdrawal force.

To determine the wet tuft withdrawal force, samples as prepared for determining the dry tuft withdrawal force were placed in water for 10 min and, before further testing, surficially dabbed dry and thereby freed of surplus water.

The dry tuft withdrawal force and the wet tuft withdrawal force are a measure of the tuft bind provided by the precoat and of the wear properties of the carpet surface. They should therefore be as high as possible.

Measurement of Delamination Resistance:

Delamination resistance was determined in accordance with DIN EN ISO 11847 using a Zwick tester at 23° C. and 50% relative humidity. Three samples were prepared by cutting strips 5 cm wide and 20 cm long out of the particular carpet in the machine direction and delaminated by hand on the narrow side over a length of 5 cm. Each incipiently delaminated sample was clamped into a Zwick tester and the secondary backing was separated from the carpet at a rate of 300 mm/min. The overall mean of five samples was determined in accordance with DIN EN ISO 11847 from the means of the peak values of each sample in the admissible range of measurement. In effect, the first 25% of the particular measuring curve was marked and ignored for the purposes of evaluation. The next 50% of the diagram trace were divided into 5 equal sections and for each of which the particular peak value was determined. The peek values were used to calculate a mean and the means were in turn used to calculate the overall mean. Delamination resistance was reported in newtons [N].

To determine the wet delamination resistance, samples as prepared for determining the dry delamination resistance were placed in water for an additional 10 min and, before further testing, surficially dabbed dry and thereby freed of surplus water.

Measurement of Filled Films of Polymer for Resistance to Bending:

The bending resistance properties of filled films of polymer were tested as a measure of the flexibility of the ready-produced carpet using the above-described formulations of carpet coating compositions.

The carpet coating compositions were blade coated onto a glass pane in a film thickness of 2 mm. The filled films of polymer were predried at 23° C. and 50% relative humidity for 24 hours. Prior to further treatment, 5 test specimens measuring 38 mm×50 mm were diecut out per carpet coating composition.

The test specimens thus prepared and predried were then treated in the same way as the carpets finished with the corresponding carpet coating composition by being thermally aftertreated in a drying cabinet at 130° C. for 20 minutes and subsequently, after cooling down, stored under standard conditions (23° C. and 50% relative humidity) for 1 hour. The bending resistance was measured in mN according to SCAN P 29:95 (STANDARD) following the final storage period.

To carry out the measurement, the test specimens were one after the other clamped into the instrument (L&W Bending Resistance Tester SE 016) and measured over a test length of 25 mm at a bending angle of 15°. The maximum resistance to bending was determined as the force in mN which appears on deflection of the sample under a constant angular velocity for a preselected test length. The results thus obtained were divided by the film thickness for arithmetic conversion into a specific bending resistance in mN/mm in order that differences in the thicknesses of the films measured may be corrected. Film thickness was determined with a pm meter at 5 points and averaged.

Example 1

Table 1 describes the results of measurement of the mechanical properties of ready-produced carpets obtained from binder mixtures of dispersions A (Tg 7° C., mixed-stabilized) and B (Tg 33° C.).

The delamination resistances and tuft withdrawal forces from the mechanical tests can be condensed into one collective parameter to summarize the combined properties from mechanical testing and minimize any operator effects that may arise. Said collective parameter is likewise informative about the performance of the dispersion mixtures versus the unmixed dispersion. Where the collective value of the mixture is higher than the values of the original dispersions, a reinforcing effect can be assumed to be involved.

Examples 1.A to 1.E demonstrates the adjustability of the specific bending resistance of the filled film as an indication in respect of the ready-produced carpet about the choice of the mixing ratio between vinyl acetate-ethylene copolymer dispersion and vinyl acetate homopolymer dispersion.

Bending resistance is generally better for the mixtures than for formulations comprising just one dispersion. This also applies to the tuft withdrawal force, which is generally better for the mixtures. It is further the case that a blend ratio of 40 wt % VAE dispersion to 60 wt % VAc dispersion (Example 1.0) displays a higher collective parameter than the dispersions used on their own.

TABLE 1

Test results for mixtures of dispersions A and B.

| Example 1 | Disp. A wt % | Disp. B wt % | Delamination resistance dry [N] | Tuft withdrawal force dry [N] | Collective parameter [N] | Bending resistance* [mN/mm] |
|---|---|---|---|---|---|---|
| 1.A | 100 | 0 | 44.4 | 31.4 | 75.8 | 678 |
| 1.B | 90 | 10 | 38.3 | 37.4 | 75.7 | 1260 |
| 1.C | 70 | 30 | 39.7 | 42.3 | 82.0 | 2728 |
| 1.D | 40 | 60 | 56.9 | 34.2 | 91.1 | 4304 |
| 1.E | 0 | 100 | 59.6 | 28.6 | 88.2 | X |

*Bending resistances reported as X could not be measured because of excessive siftfness; the corresponding carpets displayed no flexibility whatsoever, the back coating breaking on bending.

Example 2

Combinations of a polyvinyl alcohol-stabilized vinyl acetate-ethylene copolymer dispersion (Disp. C) having a low Tg of −6° C. and a polyvinyl alcohol-stabilized vinyl acetate homopolymer dispersion (Disp. D) displayed similar behavior with regard to flexibility of finished carpets and mechanical testing data. Particularly worthy of note are the unexpectedly high strengths after water treatment in addition to the surprisingly simple adjustability of carpet flexibility across a wide range of mixing ratios for the dispersions.

Again, the results of the delamination resistance and tuft withdrawal testing can be condensed into one collective parameter for better assessment of overall performance. The results here for the mixtures in Examples 2.B to 2.F, especially after water treatment, are better than the results of individual dispersions.

TABLE 2

Test results or mixtures of dispersion C and D.

| Example 2 | Disp. C wt % | Disp. D wt % | Delamination resistance dry [N] | | Tuft withdrawal force dry [N] | | Bending resistance* [mN/mm] | Collective Parameter dry [N] | |
|---|---|---|---|---|---|---|---|---|---|
| | | | dry [N] | wet [N] | dry [N] | wet [N] | | dry [N] | wet [N] |
| 2.A | 100 | 0 | 58.5 | 20.1 | 28.5 | 13.4 | 989 | 87 | 33.6 |
| 2.B | 90 | 10 | 65 | 21.2 | 23.1 | 12.6 | 1818 | 88.1 | 33.8 |
| 2.C | 80 | 20 | 61 | 21.2 | 24.5 | 16.0 | 2335 | 85.5 | 37.2 |
| 2.D | 70 | 30 | 59.3 | 18.2 | 29.7 | 15.8 | 3074 | 89.0 | 34.0 |
| 2.E | 60 | 40 | 58 | 21.2 | 23.9 | 18.6 | 3202 | 81.9 | 39.8 |
| 2.F | 50 | 50 | 51.7 | 18.6 | 22.8 | 21.1 | 3282 | 74.5 | 39.9 |
| 2.G | 0 | 100 | 67.4 | 12.8 | 23.55 | 16.4 | X | 90.9 | 29.2 |

*Bending resistances reported as X could not be measured because of excessive siftfness; the corresponding carpets displayed no flexibility whatsoever, the back coating breaking on bending.

Example 3

Example 3 was a repeat of the testing of mixtures of purely polyvinyl alcohol-established dispersions of Example 2 except that the vinyl acetate-ethylene copolymer dispersion had a lower ethylene content and a glass transition temperature of 15° C. (Disp. E). The vinyl acetate homopolymer was the low-viscosity polymer used in Example 2 (Disp. D).

Again, the blends displayed in their collective parameters of mechanical strength better properties than their corresponding individual dispersions. The polymer base being harder if only because of a higher Tg (15° C.) of the vinyl acetate-ethylene copolymer, the blend in Example 3.c was already the end of the line for measurable bending resistance.

TABLE 3

Test results or mixtures of dispersion E and D

| Example 3 Ex. | Disp. E wt % | Disp. D wt % | Delamination resistance dry [N] | Tuft withdrawal force dry [N] | Bending resistance* dry [mN/mm] | Collective Parameter dry [N] |
|---|---|---|---|---|---|---|
| 3.A | 100 | 0 | 69.1 | 28.8 | 1853 | 98.0 |
| 3.B | 90 | 10 | 63.6 | 37.6 | 2950 | 101.3 |
| 3.C | 70 | 30 | 65.0 | 33.8 | 4472 | 98.8 |
| 3.D | 40 | 60 | 65.3 | 24.4 | X | 89.8 |
| 3.E | 0 | 100 | 67.4 | 23.5 | X | 91.0 |

*Bending resistances reported as X could not be measured because of excessive sitffness; the corresponding carpets displayed no flexibility whatsoever, the back coating breaking on bending.

Example 4 blends formed from the hard vinyl acetate-ethylene dispersion of Example 3 (Tg=15° C., Disp. E) with a higher-viscosity homopolymer dispersion based on vinyl acetate (Disp. B) displayed distinctly better values than the individual dispersions starting with Example 4.B at just 10% of homopolymer dispersion in the mechanical testing results.

TABLE 4

Test results or mixtures of dispersion E and B

| Example 4 Ex. | Disp. E wt % | Disp. B wt % | Delamination resistance dry [N] | Tuft withdrawal force dry [N] | Bending resistance* dry [mN/mm] | Collective Parameter dry [N] |
|---|---|---|---|---|---|---|
| 4.A | 100 | 0 | 69.1 | 28.8 | 1853 | 98.0 |
| 4.B | 90 | 10 | 67 | 38.8 | 3743 | 105.8 |
| 4.C | 40 | 60 | 69.4 | 30.3 | X | 99.8 |
| 4.D | 0 | 100 | 59.6 | 28.1 | X | 88.3 |

*Bending resistances reported as X could not be measured because of excessive sitffness; the corresponding carpets displayed no flexibility whatsoever, the back coating breaking on bending.

Examples 5 to 7

Examples 5 to 7 represent comparative experiments where mixtures with homopolymers and commercially available styrene-butadiene copolymers were prepared using in each case two as-used ratios (each based on the solids fraction of the dispersion, i.e., polymer on polymer in wt %/wt %), 60 wt % to 40 wt %, and vice versa.

The solids contents which result are summarized in Table 5 (column 3). The deviations from the target solids content of 81.5%, the solids content of the formulations formed from vinyl acetate-ethylene and vinyl acetate homopolymer mixtures, are appreciable in some instances.

This entails an immediate increase in formulating and processing costs owing to the higher quantity of water to be evaporated. Such low solids contents of the formulation are therefore commercially unattractive.

The incompatibility between polyvinyl alcohol-stabilized vinyl acetate homopolymer dispersions and styrene-butadiene copolymers becomes apparent, as mentioned in WO 2013/123210, on mixing the two dispersions directly. Without admixture of emulsifiers or substantial dilution, these mixtures are notable for an appreciable increase in viscosity as a function of mixing ratio.

The data of mixture viscosities are likewise reported in Table 5, Such high viscosities are generally impossible to process in typical facilities and can lead to long down times for parts of a facility.

By contrast, the mixtures of vinyl acetate-ethylene copolymers with vinyl acetate homopolymers do not lead to such viscosity increases while it is similarly easy to achieve the 81.5% target solids content for the formulation.

Examples 8 to 10 verify the compatibility of vinyl acetate-ethylene dispersions and vinyl acetate homopolymer dispersions with viscosity data for the mixture in the same mixing ratios as in Examples 5 to 7. The advantage here resides particularly in the compatibility of the two polymers and the compatibility of the stabilization systems. In addition, as already demonstrated in Examples 1 to 4, the mixtures of the invention are associated with further positive effects, such as the control over flexibility and the improvement in mechanical properties.

TABLE 5

Summary of viscosities for dispersion mixtures.

| Examples 5-10 | | Solids content of formulation | Ratio | | Viscosity Mixture of dispersions |
|---|---|---|---|---|---|
| Ex. | Mixtures of dispersions Disp./Disp. | wt % | SB/VAc wt % | VAE/VAc wt % | [mPa s] |
| 5 | V1/B | 75.8 | 60/40 | | 129000 |
| 6 | V2/B | 77.6 | 60/40 | | 150000 |
| 7 | V3/B | 72.6 | 60/40 | | 70000 |
| 8 | A/B | 81.5 | | 60/40 | 3330 |
| 9 | C/D | 81.5 | | 60/40 | 358 |
| 10 | E/B | 81.5 | | 60/40 | 3780 |

The SB/VAc ratio refers to the blending ratios of the dispersions in columns 3 and 4 based on the solids content of the particular dispersion.
SB: styrene-butadiene dispersion,
VAc: vinyl acetate homopolymer dispersion

What is claimed is:

1. A method of coating a carpet, comprising coating the carpet with a mixture comprising an aqueous dispersion of a vinyl acetate polymer and an aqueous dispersion of a vinyl acetate-ethylene copolymer.

2. The method as claimed in claim 1, wherein the vinyl acetate polymer is obtained via free-radically initiated emulsion polymerization in an aqueous medium of 99 to 100 wt % of vinyl acetate and optionally up to 1 wt % of further comonomers, all based on the total weight of the monomers, while the particulars in weight % add up to 100 wt % in each case.

3. The method as claimed in claim 1, wherein the vinyl acetate-ethylene copolymer is obtained via free-radically initiated emulsion polymerization in an aqueous medium of 65 to 98 wt % of vinyl acetate and 2 to 30 wt % of ethylene and optionally up to 10 wt % of further comonomers, all based on the total weight of the monomers, while the particulars in weight % add up to 100 wt % in each case.

4. The method as claimed in claim 1, wherein the polymerization of the vinyl acetate polymer is effected in the presence of protective colloid, optionally in combination with emulsifier.

5. The method as claimed in claim 1, wherein the polymerization of the vinyl acetate-ethylene copolymer is effected in the presence of protective colloid or in the presence of emulsifier or in the presence of a combination of emulsifier and protective colloid.

6. The method as claimed in claim 4, wherein the polymerization of the vinyl acetate polymer and the polymerisation of the vinyl acetate-ethylene copolymer are each effected in the presence of partially hydrolyzed polyvinyl alcohol having an 80 to 95 mol % degree of hydrolysis and a Hoeppler viscosity in 4% aqueous solution of 1 to 40 mPas according to Hoeppler method at 20° C., DIN 53015.

7. The method as claimed in claim 1, wherein the mixture comprises at least one aqueous dispersion of a vinyl acetate polymer and at least one aqueous dispersion of a vinyl acetate-ethylene copolymer at a weight fraction of 10 to 60 wt % of vinyl acetate polymer, both based on the total weight of vinyl acetate polymer and vinyl acetate-ethylene copolymer (dry/dry).

8. A carpet coating composition prepared from a mixture comprising an aqueous dispersion of a vinyl acetate polymer and an aqueous dispersion of a vinyl acetate-ethylene copolymer, and 100 to 1400 wt % of fillers, based on the weight of the mixture of vinyl acetate polymer and vinyl acetate-ethylene copolymer (dry/dry), and water, and optionally one or more additives and optionally one or more added substances, wherein the vinyl acetate-ethylene copolymer is obtained via free-radically initiated emulsion polymerization in an aqueous medium of 65 to 98 wt % of vinyl acetate and 2 to 30 wt % of ethylene and optionally up to 10 wt % of further comonomers, all based on the total weight of the monomers, and wherein the mixture of the aqueous dispersions and the filler has a Brookfield viscosity of <7000 mPas at a solids content of 75 to 85 wt % before the admixture of additives and added substances.

9. A carpet coated with one or more carpet coating compositions as claimed in claim 8 in a precoat and/or secondary coating.

* * * * *